United States Patent [19]

Givens et al.

[11] E Re. 29,466

[45] Reissued Nov. 1, 1977

[54] IN-SITU ASSAYING FOR URANIUM IN ROCK FORMATIONS

[75] Inventors: Wyatt W. Givens; Richard L. Caldwell; William R. Mills, Jr., all of Dallas, Tex.

[73] Assignee: Mobil Oil Corporation, New York, N.Y.

[21] Appl. No.: 684,133

[22] Filed: May 7, 1976

Related U.S. Patent Documents

Reissue of:

[64] Patent No.: 3,686,503
Issued: Aug. 22, 1972
Appl. No.: 38,244
Filed: May 18, 1970

[51] Int. Cl.[2] ..... G01V 5/00
[52] U.S. Cl. ..... 250/269
[58] Field of Search ..... 250/269, 390, 391

[56] References Cited

U.S. PATENT DOCUMENTS 3,456,113 7/1969 Keepin ..... 250/391

FOREIGN PATENT DOCUMENTS 15,703 10/1962 Israel.

*Primary Examiner*—Davis L. Willis
*Attorney, Agent, or Firm*—C. A. Huggett; W. J. Scherback

[57] ABSTRACT

The specification discloses a technique for assaying for delayed fission neutrons from uranium to obtain a quantitative measure of uranium ore grade. In one embodiment, a pulsed neutron source of 14-Mev neutrons and a neutron detector are located in a borehole at the level of a formation of interest. The source is operated cyclically to irradiate the formations with bursts of fast neutrons, and the resulting neutrons from the formations are detected. Measurements are made of those neutrons detected between neutron bursts and indicative of delayed neutrons emitted as a result of neutron fission of uranium. Measurements also are obtained in a nonore-bearing formation to record the count of delayed neutrons emitted from oxygen when irradiated. These measurements are compared with those obtained in the ore-bearing formations of interest to correct for the effect of the oxygen background.

11 Claims, 1 Drawing Figure

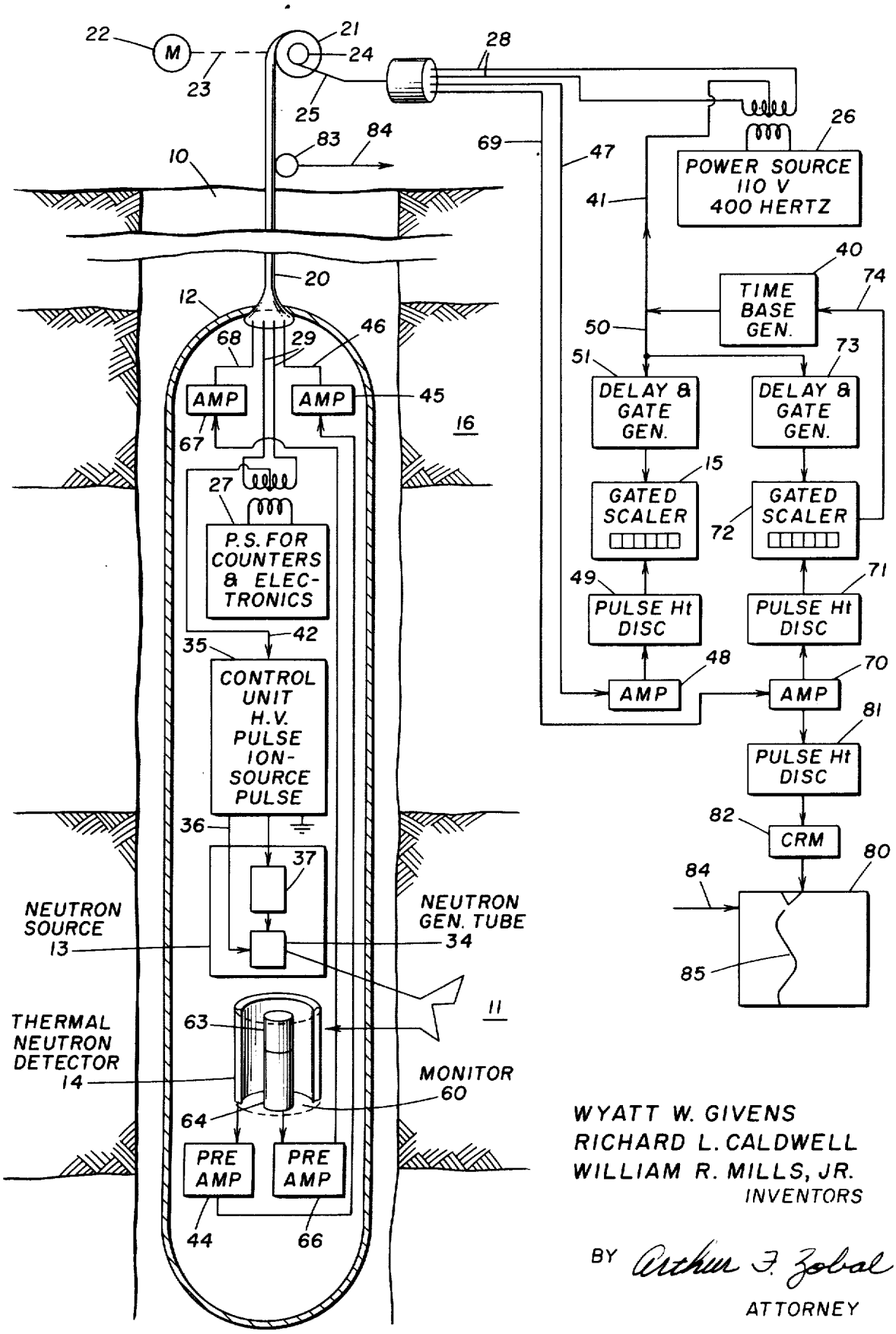
WYATT W. GIVENS
RICHARD L. CALDWELL
WILLIAM R. MILLS, JR.
INVENTORS
BY Arthur F. Zobal
ATTORNEY

IN-SITU ASSAYING FOR URANIUM IN ROCK FORMATIONS

Matter enclosed in heavy brackets [ ] appears in the original patent but forms no part of this reissue specification; matter printed in italics indicates the additions made by reissue.

BACKGROUND OF THE INVENTION

Natural gamma-ray logging currently is used as a qualitative indicator of uranium mineralization in an earth formation penetrated by a borehole, i.e., a high gamma-ray count rate on a natural gamma-ray log suggests a mineralized region. The natural gamma-ray logs obtained by conventional practice cannot be used as a reliable quantitative measure of uranium ore grade. This is due primarily to conditions of disequilibrium which exist between the parent uranium-238 and the daughter elements, especially bismuth-214, which emit the bulk of gamma rays contributing to the natural gamma-ray log. Disequilibrium has been found to exist when the radioactive daughter elements, through various processes such as leaching, become separated from the parent uranium. If sufficient time has not elapsed between the separation of the uranium parent and the radioactive daughter elements, a relatively low natural gamma-ray activity may be present at the actual ore body. On the other hand, one can find high natural radioactivity coming from the separated daughters with little or no uranium present.

In addition to the above, other elements, particularly potassium and thorium, emit natural gamma radiation. This radiation, when detected and recorded, reduces the effectiveness of a natural gamma-ray log as a quantitative measure of uranium ore grade.

Current exploration practice is carried out by drilling exploration holes extensively on a widely separated pattern and very extensively on a closer pattern after a good show of mineralization is found by natural gamma-ray logging. Core holes are drilled and the cores extensively assayed chemically to quantitatively evaluate the ore deposit. This practice, however, is very expensive. For example, the costs of coring a hole and chemically assaying the cores are seven to ten times the cost of an exploration hole. Moreover, the presently used technology misses many ore bodies because all natural gamma-ray anomalies suggestive of ore grade mineralization cannot be confirmed because of the prohibitive costs of coring and chemical assaying.

SUMMARY OF THE INVENTION

In accordance with the present invention, there is provided an inexpensive, in-situ assay method for quantitatively measuring uranium ore grade. In subsurface assaying operations, a tool containing a source of neutrons and a neutron detector are located in a borehole at the level of a formation of interest. The source is operated cyclically to irradiate a zone in said formation with neutrons. Neutrons resulting from the irradiation of said zone in said formation are detected and recorded to obtain a record of delayed neutrons emitted as a result of neutron fission of uranium. Recording takes place within each cycle beginning at a time period after the source neutrons have died away via absorption in the formation.

Since the present invention detects neutrons emitted as a result of the fission process, a measure of uranium can be obtained which is unaffected by disequilibrium. Although thorium may emit fission neutrons, its effect normally will be small.

When a 14-Mev neutron source is employed, oxygen-17 in the formations will be activated. In the decay process of the induced activity, delayed neutrons are emitted, resulting in a delayed neutron background. In accordance with another aspect of the present invention, there is provided a technique for reducing the effect of these neutrons on the records obtained. The source and detector are located at the level of a nonuranium-bearing formation. The source is operated cyclically to irradiate the nonuranium-bearing formation with bursts of fast neutrons spaced in time, and neutrons resulting from the irradiation of the formation are detected. A record is obtained of the neutrons emitted by oxygen as a result of irradiation for comparison with the count of neutrons recorded at the formation of interest to compensate for the effect of delayed neutrons from oxygen in the formation of interest.

BRIEF DESCRIPTION OF THE DRAWING

The FIGURE illustrates a borehole tool and recording system for carrying out the invention.

DETAILED DESCRIPTION OF THE INVENTION

Referring to the FIGURE, there will be described the present invention and a system for obtaining a quantitative measure of uranium ore grade in formations of interest traversed by a borehole illustrated at 10. The formation to be investigated or assayed is shown at 11. This formation is found initially from the relatively high count rate on a natural gamma-ray log previously obtained in the borehole. In order to determine whether uranium in fact is present and to obtain a quantitative measure of the ore grade, a borehole tool 12 is lowered into the borehole to this formation. The tool 12 contains a neutron source 13 and a thermal neutron detector 14. In one embodiment, the source 13 is an accelerator-type source which produces 14-Mev neutrons. The tool 12 is positioned to locate the source and the detector at the level of the formation 11, and the source is operated cyclically to produce bursts of fast neutrons spaced in time to irradiate the formation. In the formation matrix, many of the fast neutrons from the source are moderated or slowed to thermal energies. Both thermal and fast neutrons react with uranium, if present, for the production of delayed fission neutrons. These fission neutrons are slowed in the formation to thermal energies and are detected by the thermal neutron detector 14 which produces an output pulse for each neutron detected. The output of the detector 14 is transmitted to the surface to a gated scaler 15.

Cyclic activation is carried out whereby a zone or region in the formation 11 is irradiated cyclically, and counting by the scaler 15 is delayed following each irradiation period to obtain a measure predominantly of the delayed fission neutrons emitted from uranium. The process is repeated and the counts in the scaler 15 are accumulated.

The table following sets forth six groups of delayed fission neutrons from uranium. These neutrons are emitted from fission of uranium by thermal or fast neutrons. A detailed discussion of this phenomenon can be found in NUCLEAR PHYSICS by Irving Kaplan, Addison- Wesley Publishing Company, Inc., Reading, Massachusetts, Palo Alto, London, 1955, 1963, Second Edition, Chapter 19.

TABLE

REPRESENTATIVE DELAYED FISSION NEUTRON GROUPS FROM URANIUM

| Group | Group Half Life (Seconds) | Relative Group Abundance |
|---|---|---|
| 1 | 55.72 | 0.033 |
| 2 | 22.72 | 0.219 |
| 3 | 6.22 | 0.196 |
| 4 | 2.30 | 0.395 |
| 5 | 0.61 | 0.115 |
| 6 | 0.23 | 0.042 |

As can be understood from the table, the more abundant delayed neutron groups have shorter half lives, the most abundant group having a half life of about 2.3 seconds. In one embodiment, the source 13 and the scaler 15 are operated to emphasize the shorter-lived, delayed fission groups. In this respect, the source 13 may be operated to produce very short neutron bursts at a repetition rate within the range of from one to five burst per second. In one embodiment, the source may be operated at two bursts per second, each burst having a duration of about 3 microseconds. Cyclic irradiation may be carried out for a period of about 5 minutes. During this time, the detector 14 may be operated continuously to detect thermal neutrons. The scaler 15 is operated to count only thermal neutrons detected between neutron bursts and beginning at a time period after the moderated neutrons from the source have died away, i.e., have been absorbed by the formation. Complete die away of the source neutrons in most formations takes place in the order of 2 to 3 milliseconds following the termination of each neutron burst. In order to ensure that no moderated source neutrons are counted, scaler 15 is operated to begin counting at 5 milliseconds after each neutron burst and counts until the beginning of the next neutron burst. It then stops counting but begins counting again within the same corresponding time period during the next cycle. Counting by the scaler 15 also is carried out for about a 5-minute period.

The numerical output of the scaler is a function of the number of uranium atoms per unit volume of the formation which are directly relatable to uranium ore grade. As mentioned above, although other elements such as thorium may produce fission neutrons, the cross section of these elements for the fission process is very small. Hence, the effect of thorium is insignificant except at very high concentrations.

When a 14-Mev source is used, oxygen in the formation 11, however, will produce a neutron background level which contributes to the neutrons detected and counted by the scaler 15. When oxygen-17 is irradiated with neutrons of energy greater than 7.93 Mev, the following reaction takes place:

$$O^{17}(n,p)N^{17} \xrightarrow{\beta^-} O^{17} \longrightarrow O^{16} + n \qquad (1)$$

The resulting neutrons produced have a maximum energy of about 2.2 Mev. Since the half life of the beta decay is of the order of 4.14 seconds, these neutrons are produced within the same time period that the shorter-lived fission groups from uranium are produced. Thus, they contribute to the count obtained by the scaler 15. In low uranium ore grades, correction should be made for the oxygen background. The oxygen contribution is corrected by counting the oxygen background in a nonore-bearing formation and comparing this count with the total count obtained in the ore-bearing formation of interest. It is found that corrections may be obtained in this manner since there is little variation in the change of oxygen content from formation to formation within a given region. In this respect, it has been found that most formation matrices contain about fifty percent oxygen, with the change in oxygen content between formations being about seven to eight percent. In order to obtain the best estimate of oxygen background in the ore zone, a clean zone containing no neutron-fission-producing ores, and preferably close to the ore zone, is chosen to obtain oxygen background measurements. One such zone may be the formation illustrated at 16. In order to obtain the background measurements, the tool 12 is raised to locate the source 13 and the detector 14 at the level of the formation 16. The source 13 and the scaler 15 then are operated in the same manner as that described with respect to the investigation of the formation 11. The counts obtained by the scaler 15 then are observed and subtracted from those obtained in the investigation of the formation 11. It is to be understood that the background measurements may be obtained prior to or after the formation of interest is investigated.

The resulting count obtained after oxygen background correction is a quantitative measure of the uranium concentration. A very low count will indicate little or no uranium, while progressively higher counts will indicate higher concentrations of uranium. The exact relationship between the resulting counts produced and the uranium concentration is obtained by calibration measurements carried out with the tool 12 operated in a plurality of known uranium ore grades of different uranium concentrations.

More details of the borehole and uphole system now will be described. The logging tool 12 comprises a steel housing which is supported by a cable 20. This cable is unwound and wound from and upon a drum 21 driven by motor 22 and connection 23 in order to lower and raise the tool 12 in the borehole. Slip rings and brushes illustrated at 24 and 25, respectively, are employed to couple the conductors of cable 20 to the various uphole equipment for the transmission of signals and voltages. Power from an uphole power source 26 is transmitted downhole to a downhole power supply 27 by way of conductors illustrated at 28, slip rings and brushes 24 and 25, and cable conductors illustrated at 29. For simplicity, connection is not shown between the downhole power supply 27 and the counters and other electronics.

In one embodiment, the pulsed neutron source 13 comprises a neutron generator tube 34 which contains a target and an ion source (not shown). Pulsing is carried out by applying a high voltage pulse (5 kilovolts in one embodiment) to the ion source and simultaneously a negative-going pulse (125 kilovolts in one embodiment) to the target. A source of this type is manufactured by Kaman Nuclear of Colorado Springs, Colorado. The ion source pulse is generated by control unit 35 and applied to the ion source by way of conductor 36. In addition, the control unit 35 generates a negative pulse which is stepped to −125 kilovolts by transformer 37 and applied to the target. A trigger pulse generated uphole is applied periodically to actuate the control unit 35 for the production of a high voltage and ion source pulses for pulsing the neutron generator tube 34. In this respect, a time-base generator 40 located uphole periodically generates a trigger pulse at the desired pulsing rate, for example, two pulses per second. This pulse is applied downhole to the control unit 35 by way of conductors 41, 28, 29, and 42.

The thermal neutron detector 14 preferably is a helium-3 detector. It may be cylindrical in form and of the type described in U.S. Pat. No. 3,359,443. In the alternative, there may be employed one or a plurality of helium-3 detectors of the type shown in U.S. Pat. No. 3,102,198. The output pulses of detector 14 are preamplified at 44, amplified by way of amplifier 45, and transmitted to the surface by way of conductor 46. At the surface, pulses from conductor 46 are applied to conductor 47, amplified at 48, and applied to pulse height discriminator 49 which biases out the background level and applies the pulses representative of thermal neutrons detected to the scaler 15. At the surface, trigger pulses from time-base generator 40 are applied by way of conductor 50 to a delay and gate generator 51. This generator produces a gating pulse beginning at about 5 milliseconds following termination of a neutron burst and lasting until the next trigger pulse. This gating pulse is applied to scaler 15 to enable the scaler for counting for the duration of the gating pulse.

Located within the detector 14 and adjacent the neutron source 13 is a detector or monitor 60 for obtaining a measure of the output from the pulsed neutron source 13. The output of an accelerator-type neutron source may vary during its operation. Hence, it is desirable to monitor the output to know that a constant output is produced during each assaying period or to correct or compensate for variations in neutron output. The response time of a conventional fast neutron detector, however, is not fast enough to detect directly and measure accurately the number of neutrons produced by the source when it is being operated to produce neutrons during a very short burst time, for example, of the order of 3 microseconds.

In one embodiment, the monitor 60 may be a gamma-ray detector which is employed to detect the delayed gamma rays emitted from oxygen in the formations when irradiated with fast neutrons from the 14-Mev neutron source. The reaction is $$O^{16}(n,p)N^{16} \xrightarrow{\beta^-} O^{16} + \gamma$$

Nitrogen-16 decays by beta emission with a half life of 7.14 seconds. The gamma rays emitted following beta decay predominantly are 6.14-Mev gamma rays and some 7.12-Mev gamma rays. The number of these gamma rays emitted are proportional to the number of fast neutrons produced by the source. Moreover, they are emitted over a time period sufficient to allow representative counting by a conventional gamma-ray detector. Thus, since the oxygen in the formations is relatively constant, one may detect the delayed gamma rays from oxygen to obtain a measure of the neutron output produced by the source.

In one embodiment, the monitor 60 for obtaining an indirect measure of the neutron source output may comprise a low-Z, plastic scintillator 63 coupled to a photomultiplier tube 64.

The output of the photomultiplier tube 64 is amplified by amplifiers 66 and 67 and transmitted by conductor 68 to the surface to conductor 69. This output comprises electrical pulses having heights proportional to the electron energy of Compton interaction by gamma rays. At the surface, the output pulses are amplified by amplifier 70 and applied to pulse height discriminator 71. This discriminator is adjusted to pass only those pulses representative of gamma radiation detected and having energy above 3 Mev or slightly higher. This is done to bias out the lower energy background. The output of pulse height discriminator 71 is applied to gated scaler 72 which produces a count proportional to the number of neutrons produced by the source 13. Scaler 72 is enabled for counting between neutron bursts within the same period that scaler 15 is enabled for counting. Delay and gate generator 73 periodically is actuated by the trigger pulses produced from time-base generator 40 for the production of a gating signal periodically to enable the scaler 72 to count during this time period. After the scaler 72 records a predetermined count, a control signal is applied by way of conductor 74 to turn OFF the time-base generator 40. This will terminate the downhole neutron pulsing operations as well as counting by both of the scalers 15 and 72. In one embodiment, the scalers may be of the type manufactured by Canberra Industries, Model No. 1471, or Systems Development Incorporated, Model No. 5210 frequency counter.

The use of the monitor 60 to monitor the output of the neutron source indirectly by measuring the delayed gamma rays from oxygen is described and claimed in a copending application filed by Richard L. Caldwell and Wyatt W. Givens on the same date as the present application is filed. This copending application is entitled METHOD OF INDIRECTLY MONITORING THE OUTPUT OF A PULSED NEUTRON SOURCE. Its U.S. Ser. No. is 38,226.

During assaying operations, the photomultiplier tube 64 may be gated OFF during each period that the source 13 is producing neutrons. This will avoid gain shift due to the high intensity of neutrons and gamma rays produced during the neutron burst time. A gating pulse may be derived from the trigger pulse from conductor 42. The photomultiplier tube 64 is turned ON between neutron bursts to allow detection and measurement of delayed gamma rays from oxygen.

The scintillator 63 and photomultiplier tube 64 perform a dual function of locating the formation 11 for carrying out the assaying operations. For example, the formation 11 is selected for assaying from the high count rate shown on a natural gamma-ray log previously obtained. The tool 12 then is lowered into the borehole 10 with the photomultiplier tube 64 in operation. Uphole, the output of scintillator 63 and photomultiplier tube 64 is applied to a continuous-trace recorder 80 by way of pulse height discriminator 81 and count-rate meter 82. The chart of the recorder 80 is driven in correlation with depth of the tool 12 in the borehole. This is done by reel 83 and connection 84. Thus, as the tool 12 is lowered, the scintillator will detect natural gamma radiation which will be recorded by the recorder 80 as a continuous trace 85. The operator will observe the trace 85 and when there is recorded a high count rate corresponding to that recorded by the natural gamma-ray log previously obtained, the operator will know that the neutron source and the thermal neutron detector are at the level of the formation of interest. Lowering of the tool 12 will be terminated and assaying operations begun. The purpose of the pulse height discriminator 81 is to bias out the background level. In this respect, the discriminator may be adjusted to pass pulses representative of gamma radiation having energies above 0.1 Mev.

Although an accelerator-type neutron source was disclosed for carrying out cyclic activation for assaying for uranium, it is to be understood that other types of sources may be used. For example, a source mechanically controlled may be employed to irradiate cyclically a zone in the formations adjacent the thermal neutron detector for carrying out the assaying operations. Mechanically controlled sources for carrying out cyclic activation have an output which is more constant than that of an accelerator-type source, thus eliminating the need for a neutron output monitor. If the energy of the neutrons produced by the source employed is less than 7.93 Mev, delayed neutrons from oxygen will not be produced, thus eliminating the need for correcting for delayed neutrons from oxygen.

What is claimed is:

1. A method of assaying for uranium in the formation traversed by a borehole and to obtain information indicative of the interfering effect of oxygen in said formations, comprising the steps of:

locating a pulsed neutron source and a thermal neutron detector at the level of a nonuranium-bearing formation, said source being productive of fast neutrons having energies of about 14 Mev, operating said source to periodically irradiate said nonuranium-bearing formation with bursts of fast neutrons spaced in time, detecting neutrons resulting from the irradiation of said nonuranium-bearing formation and indicative of delayed neutrons emitted by oxygen as a result of irradiation by neutrons, locating said source and detector at the level of a formation of interest suspected of containing uranium, operating said source to periodically irradiate said formation of interest with bursts of fast neutrons spaced in time, and detecting neutrons resulting from the irradiation of said formation of interest to detect for delayed neutrons emitted as a result of neutron fission of uranium.

2. The method of claim 1 comprising the step of:

recording the quantity of neutrons detected, at each of said formations, between neutron bursts within a time period when neutrons from said source have disappeared but while delayed neutrons from oxygen and delayed fission neutrons from uranium, respectively, may be emitted.

3. A method of assaying for uranium in the formations traversed by a borehole, comprising the steps of:

locating a pulsed neutron source and a neutron detector at the level of a formation of interest suspected of containing uranium, operating said source to periodically irradiate said formation of interest with bursts of fast neutrons spaced in time *at a rate of at least about one pulse per second,* the time between each neutron burst being sufficient to allow neutrons from said source to disappear but being long enough to allow delayed neutrons emitted as a result of neutron fission of uranium to appear at said detector, detecting neutrons with said detector as a result of the irradiation of said formations with bursts of fast neutrons, and obtaining measurements of the quantity of neutrons detected between neutron bursts at a time period when neutrons from said source have disappeared but while delayed fission neutrons from uranium may be emitted.

4. The method of claim 3 comprising the steps of:

locating said source and detector at the level of a nonuranium-bearing formation, operating said source to periodically irradiate said nonuranium-bearing formation with bursts of fast neutrons spaced in time, and detecting neutrons resulting from the irradiation of said nonuranium-bearing formation and indicative of neutrons emitted by oxygen as a result of irradiation by fast neutrons for comparison with said neutrons detected and recorded upon irradiation of said formation of interest.

5. A method of assaying for uranium in formations traversed by a borehole, comprising the steps of:

locating a borehole tool containing a source of neutrons and a neutron detector at the level of a formation of interest suspected of containing uranium, operating said source cyclically *at a rate of at least one cycle per second* to irradiate with neutrons a zone of said formation of interest, detecting neutrons resulting from the irradiation of said zone of said formation of interest, and recording the counts of neutrons detected within each cycle of operation when delayed neutrons resulting from neutron fission of uranium are expected to be detected by said detector.

6. A method of locating and assaying for uranium in the formations traversed by a borehole, comprising the steps of:

obtaining a natural gamma-ray log of the formations traversed by said borehole and, from said natural gamma-ray log, identifying formations of interest suspected of containing uranium, locating a borehole tool containing a source of neutrons and a thermal neutron detector at the level of a formation of interest suspected of containing uranium, operating said source cyclically *at a rate of at least one cycle per second* to irradiate with neutrons a zone of said formation of interest, detecting thermal neutrons resulting from the irradiation of said zone of said formation of interest, and recording the counts of thermal neutrons detected within each cycle of operation when delayed neutrons resulting from neutron fission of uranium are expected to be detected by said detector.

7. The method of claim 6 comprising the steps of:

locating said borehole tool at the level of a nonuranium-bearing formation, operating said source to periodically irradiate said nonuranium-bearing formation with bursts of fast neutrons spaced in time, and detecting neutrons resulting from the irradiation of said nonuranium-bearing formation and indicative of neutrons emitted by oxygen as a result of irradiation by fast neutrons for comparison with said neutrons detected and recorded upon irradiation of said formation of interest.

8. A method of assaying for natural uranium-bearing rock, comprising the steps of:

locating a pulsed neutron source productive of fast neutrons having energies greater than 7.93 Mev and a thermal neutron detector adjacent a nonuranium-bearing rock formation, operating said source to periodically irradiate said nonuranium-bearing formation with bursts of fast neutrons spaced in time, detecting neutrons resulting from the irradiation of said nonuranium-bearing formation and indicative of delayed neutrons emitted by oxygen as a result of irradiation by neutrons, locating said source and detector adjacent a rock formation of interest suspected of containing uranium, operating said source to periodically irradiate said formation of interest with bursts of fast neutrons spaced in time, and detecting neutrons resulting from the irradiation of said formation of interest to detect for delayed neutrons emitted as a result of neutron fission of uranium.

*9. A method of assaying for uranium in the formations traversed by a borehole, comprising the steps of:*

*locating a pulsed neutron source and a neutron detector at the level of a formation of interest suspected of containing uranium,*

*operating said source to periodically irradiate said formation of interest with bursts of fast neutrons spaced in time,*

*the time after each neutron burst being sufficient to allow neutrons from said source to disappear but being long enough to allow delayed neutrons emitted as a result of neutron fission of uranium to appear at said detector,*

*detecting neutrons with said detector as a result of the irradiation of said formations with bursts of fast neutrons at a time following each burst to emphasize the shorter-lived delayed fission groups, and*

*recording the counts of neutrons detected following each neutron burst when delayed neutrons resulting from neutron fission of uranium are expected to be present.*

*10. The method of claim 9 in which the detection of neutrons takes place during the first half life of the delayed fission neutrons identified in the Table.*

*11. A method of assaying for uranium in the formations traversed by a borehole in the presence of the interfering effect of oxygen in said formations, comprising the steps of:*

*locating a pulsed neutron source and a thermal neutron detector at the level of a formation of interest suspected of containing uranium,*

*said source being productive of fast neutrons having energies of about 14 Mev,*

*operating said source to periodically irradiate said formation of interest with bursts of fast neutrons spaced in time,*

*detecting neutrons resulting from the irradiation of said formation of interest to detect for delayed neutrons emitted as a result of neutron fission of uranium as well as neutrons indicative of delayed neutrons emitted by oxygen as a result of irradiation by neutrons, and*

*recording the detected neutrons.*

* * * * *

UNITED STATES PATENT AND TRADEMARK OFFICE

CERTIFICATE OF CORRECTION

PATENT NO. : Re. 29,466

DATED : November 1, 1977

INVENTOR(S) : Wyatt W. Givens; Richard L. Caldwell; and William R. Mills, Jr.

It is certified that error appears in the above-identified patent and that said Letters Patent are hereby corrected as shown below:

Title page, Column 1 thereof, under Related U.S. Patent Documents, "Appl. No.: 38,244" should read -- Appl. No.: 38,224 --.

Column 3, line 22, "burst" should read --bursts--.

Column 7, line 17 (Claim 1, line 1), "formation" should read --formations--.

Signed and Sealed this

Seventh Day of March 1978

[SEAL]

*Attest:*

RUTH C. MASON
*Attesting Officer*

LUTRELLE F. PARKER
*Acting Commissioner of Patents and Trademarks*